United States Patent [19]

Suzuki et al.

[11] Patent Number: 4,504,969
[45] Date of Patent: Mar. 12, 1985

[54] RECTANGULAR PATTERN RECOGNITION APPARATUS

[75] Inventors: Isao Suzuki; Yoshio Arai; Hiroyuki Kataoka, all of Kanagawa, Japan

[73] Assignee: Fuji Xerox Co., Ltd., Tokyo, Japan

[21] Appl. No.: 357,123

[22] Filed: Mar. 11, 1982

[30] Foreign Application Priority Data

Mar. 12, 1981 [JP] Japan .................................. 56-34630

[51] Int. Cl.³ ............................................. G06K 9/00
[52] U.S. Cl. ........................................ 382/10; 382/25; 382/48; 382/61
[58] Field of Search .................... 382/22, 25, 26, 44, 382/45, 48, 61, 10, 24

[56] References Cited

U.S. PATENT DOCUMENTS

| | | | |
|---|---|---|---|
| 3,553,646 | 1/1971 | Hardin et al. | 382/61 |
| 3,582,886 | 6/1971 | Hardin et al. | 382/61 |
| 3,810,094 | 5/1974 | Mori et al. | 382/61 |
| 4,272,756 | 6/1981 | Kakumoto et al. | 382/44 |

Primary Examiner—John C. Martin
Assistant Examiner—Michael D. Parker
Attorney, Agent, or Firm—Sughrue, Mion, Zinn, Macpeak and Seas

[57] ABSTRACT

A rectangular pattern recognition device is disclosed which operates to recognize and note the position of solid-line rectangles drawn on an input form, document, or the like. The apparatus first recognizes vertical and horizontal line segments and then discriminates the areas which lie within the joined segments. The device may further be provided with code or symbol recognition means which can discriminate symbols, e.g. an optional numbering of the rectangles from the other line segments forming the rectangles.

9 Claims, 14 Drawing Figures

| LINE SEGMENT #1 POSITION (SCANNING LINE #) |
|---|
| LINE SEGMENT #2 POSITION |
| LINE SEGMENT #3 POSITION |
| ⋮ |
| LINE SEGMENT #6 POSITION |

| LINE SEGMENT #1 POSITION (BIT NUMBER) |
|---|
| LINE SEGMENT #2 POSITION |
| LINE SEGMENT #3 POSITION |
| ⋮ |
| LINE SEGMENT #6 POSITION |

| FIRST LINE SEGMENT CL1 POSITION |
|---|
| SECOND LINE SEGMENT CL2 POSITION |
| |
| FIFTH LINE SEGMENT CL5 POSITION |
| SIXTH LINE SEGMENT CL6 POSITION |

| FIRST LINE SEGMENT LL1 POSITION |
|---|
| SECOND LINE SEGMENT LL2 POSITION |
| |
| ELEVENTH LINE SEGMENT LL11 POSITION |
| TWELVETH LINE SEGMENT LL12 POSITION |

RECTANGULAR PATTERN RECOGNITION APPARATUS

BACKGROUND OF THE INVENTION

In an image information processing technique wherein an original document containing letters or pictures is converted into sequential electrical signals by way of a photoelectric conversion means and, after being processed, is outputted as electrical signals or visible images, it is sometimes necessary to transcribe a certain portion of the original document at another place.

In this case, it is considered that an operator may designate the coordinate position on the original document and the coordinate position on the output images of the portion to be transcribed. However, since this method is troublesome, it is preferred to prepare an original document in which desired rectangular frames are previously described, to read the position, size and the like of the rectangular patterns automatically, recognize them, and then transcribe them automatically.

This invention concerns an apparatus for recognizing rectangular patterns or an original document and specifically, this invention concerns a rectangular pattern recognition apparatus capable of recognizing at least one rectangular pattern described on an original document, distinguishing the positional relationships of each of the rectangular patterns on the original document and applying an optional ordering, as required, to each of the rectangular patterns.

As shown in FIG. 1, for detecting rectangular patterns drawn on an original document 100, that is, regions 101, 102 and 103 surrounded by linear lines, there has generally been employed a method of tracking the line, for instance, along a dotted arrow described counterclockwise inside of the first rectangle 101. For such tracking, the original document 100 is usually read by an image input device and the optical information on the original document 100 (such as rectangles 100–103) is converted into electrical signals and stored in an image memory such as a magnetic disc.

In this case, the data from the image input device is read into the image memory, for instance, from left to right and from the top to the bottom of the original document 100, as shown by scanning lines 104 and 105 in FIG. 1.

In the method of detecting rectangular regions by line tracking, where a magnetic disc is used as the image memory and the image data are stored by line (scanning line) in the disc, four positions each indicated with a small circular symbol have to be tracked at the $n_{th}$ scanning line 106 in FIG. 1. Accordingly, for the disc region where signals of the $n_{th}$ scanning line are stored, access has to be made 4 times, which is quite wasteful and requires a longer time for tracking and pattern recognition.

SUMMARY OF THE INVENTION

An object of this invention is to eliminate or improve the foregoing effects of the prior art and to provide a rectangular pattern recognition apparatus capable of recognizing rectangular patterns in a simple manner, at high speed and with less access cycles to the image memory device.

A further object of this invention is to provide a rectangular pattern recognition apparatus capable of distinguishing rectangular patterns, and in addition, capable of applying an optional ordering to the rectangular patterns.

BRIEF DESCRIPTION OF THE DRAWINGS

This invention will now be explained more specifically referring to the accompanying drawings, in which.

DETAILED DESCRIPTION OF THE PREFERRED EMBODIMENTS

Figure 2:
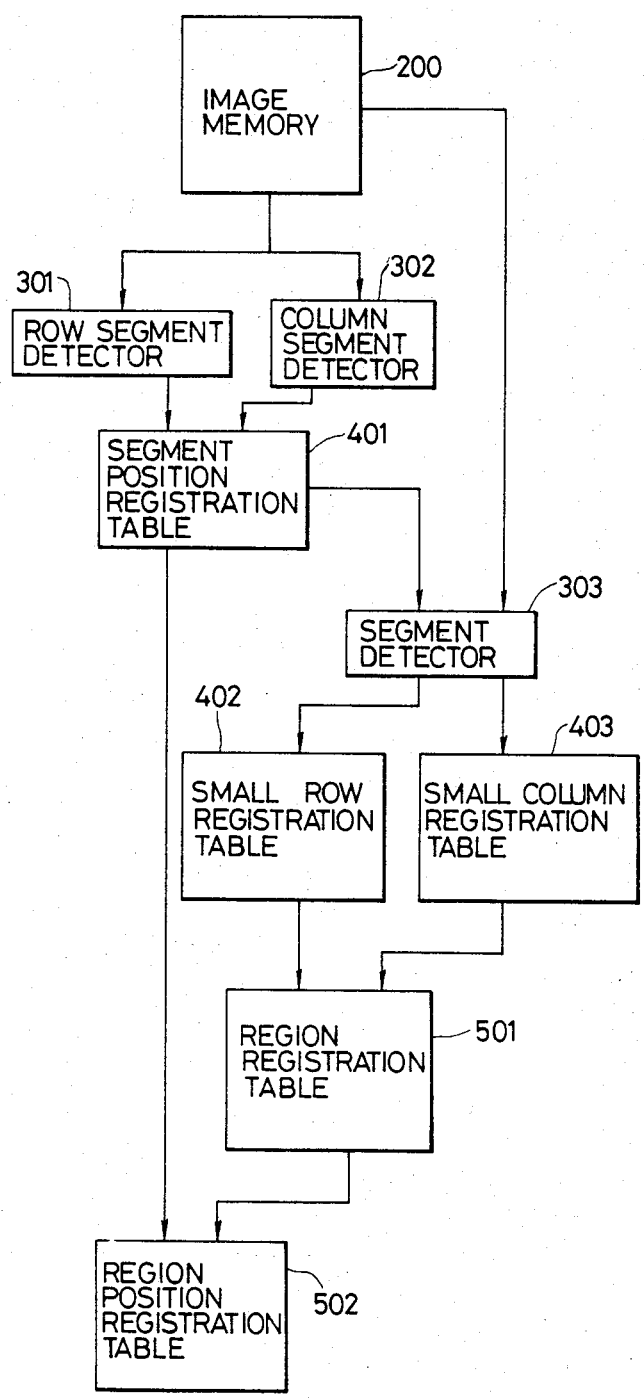
FIG. 2 is a schematic block diagram of one embodiment according to this invention.

FIG. 2 is a block diagram of one embodiment according to this invention, wherein are shown an image memory 200, a row segment detector 301, a column segment detector 302, a segment detector 303, a segment position registration table 401, a small row region registration table 402, a small column region registration table 403, a region registration table 501 and a region position registration table 502.

Figure 1:
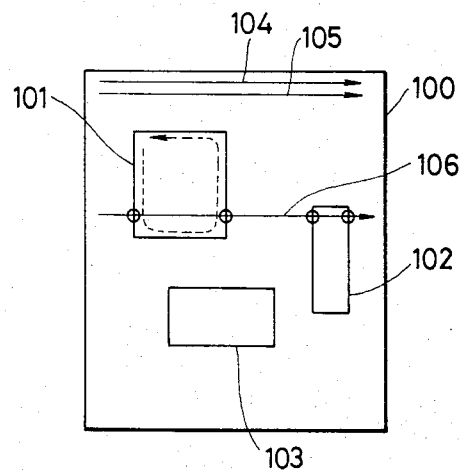
FIG. 1 is a plan view showing an original document on which are drawn rectangular patterns, as well as a prior art method for recognizing the rectangular patterns.
Figure 3:
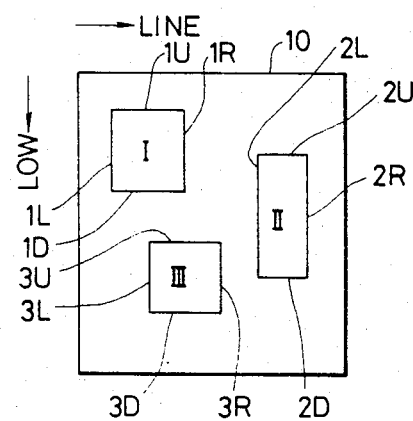
FIG. 3 is a plan view of an original document on which are drawn rectangular patterns, for use with this invention.

In this embodiment, three rectangular patterns I, II, III are drawn in solid line on an original document 10 as an object to be read out, as shown in FIG. 3. It is assumed here that, of the two pairs of parallel segments constituting the four sides of the respective rectangular patterns, one of the pair, that is, 1U and 1D, 2U and 2D and 3U and 3D are parallel to the scanning direction, while the other, that is, 1L and 1R, 2L and 2R and 3L and 3R are made perpendicular thereto.

In the drawing, the lateral direction will be designated as the row direction and the vertical direction will be designated as the column direction.

The optical images of the original document read by main scanning in the direction of the rows and by sub-scanning in the direction of the columns are converted by way of known means into binary electrical signals and are stored in the image memory 200.

Figures 4A, 4B, 5:
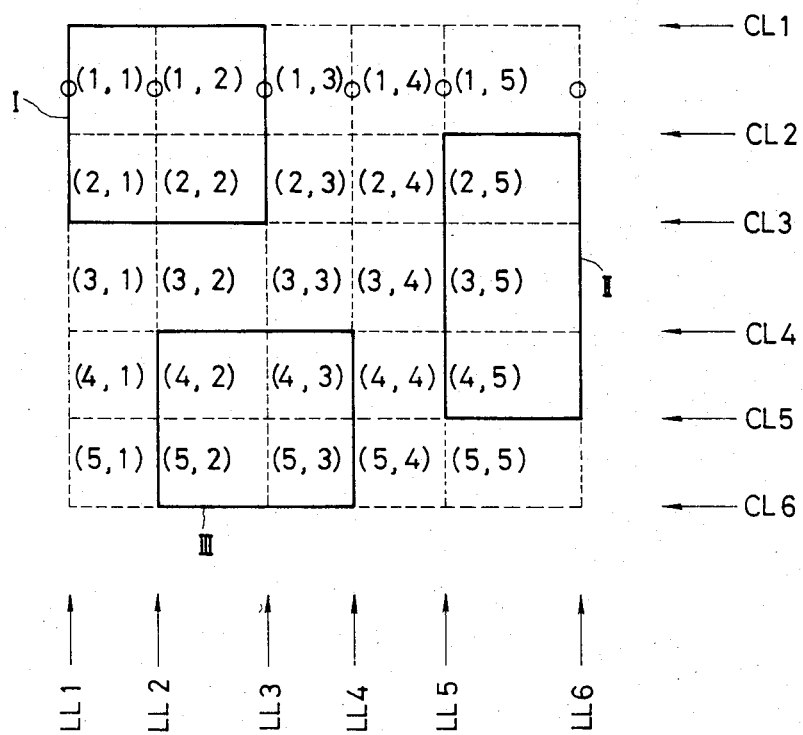
FIGS. 4(A) and 4(B) are charts showing one example of the contents of a segment position registration table in one embodiment according to this invention.
FIG. 5 is a chart showing a group of small rectangular regions generated by the segments detected on the original document shown in FIG. 3.

From the image data in the image memory 200, segments 1U, 1D, 2U, 2D, etc. drawn along the rows are first detected by the row segment detector 301, and their positions on the original document are registered in the segment position registration table 401 as shown in FIG. 4(A).

In this case, the detected segments are numbered as first, second, etc. in the order of the scanning line number. Accordingly, in the example shown in FIG. 3, the row segments are registered as shown in Table 1.

Simultaneously, segments, 1L, 1R, 2L, 2R, etc. extending along the columns are detected by the column segment detector 302, and their positions on the original document are registered in the segment position registration table 401.

TABLE 1

| Segment 1U | → | First row segment (CL1) |
|---|---|---|
| Segment 2U | → | Second row segment (CL2) |
| Segment 1D | → | Third row segment (CL3) |
| Segment 3U | → | Fourth row segment (CL4) |
| Segment 2D | → | Fifth row segment (CL5) |
| Segment 3D | → | Sixth row segment (CL6) |

The registration is carried out while attaching numbers to each of the segments such as first, second, etc. in order of the bit number of one scanning line, as shown in Table 2.

TABLE 2

| Segment 1L | → | First column segment (LL1) |
|---|---|---|
| Segment 3L | → | Second column segment (LL2) |
| Segment 1R | → | Third column segment (LL3) |
| Segment 3R | → | Fourth column segment (LL4) |
| Segment 2L | → | Fifth column segment (LL5) |
| Segment 2R | → | Sixth column segment (LL6) |

The detection of the segments in the row and column directions by the segment detectors 301, 302 and 303 can be carried out by a method where continuous black bits are regarded as a segment if present by more than a predetermined number. Such a segment detection method is known in the art.

In the manner described above, the segments shown by solid and dotted lines in FIG. 5 are registered, and further, the number for each of the detected segments is registered in the segment position registration table 401.

FIG. 5 depicts several small regions [(1,1), (1,2) ... (5,5)] which are imaginarily divided by the segments detected on the original document 10, and numbered based on the numbers of the corresponding segments.

It can be seen from FIG. 5 that the three rectangular patterns I–III shown in FIG. 3 are constituted respectively by the following assemblies of small regions:
Rectangular form I ... [(1,1), (1,2), (2,1), (2,2)]
Rectangular form II ... [(2,5), (3,5), (4,5)]
Rectangular form III ... [(4,2), (4,3), (5,2), (5,3)]

The rectangular pattern can be distinguished by the relation of the combination between each of the small imaginary regions and the solid segments. The procedures will be described specifically later. The presence or absence of solid column segments at the positions indicated with the circular symbols intermediate the first segment CL1 and the second segment CL2 in the row shown in FIG. 5 is examined by the segment detector 303 in accordance with a known method. Then, the number (1,1) for the small region to the right of the first solid segment LL1 is registered in the small row region registration table 402, as shown in Table 3.

TABLE 3

| (1, 1) | (1, 2) | D |
|---|---|---|
| (2, 1) | (2, 2) | D |
| (2, 3) | (2, 4) | D |
| (2, 5) | D | |
| (3, 5) | D | |
| (4, 2) | (4, 3) | D |
| (4, 4) | D | |
| (4, 5) | D | |
| (5, 2) | (5, 3) | D |

Then, the presence or absence of solid column segments at the position indicated with the second circular symbol between the above mentioned region (1,1) and the adjacent small region (1,2) is examined by the segment detector 303. Since no solid segment is present therein, the small region (1,2) is registered in the small row region registration table 402 as being continued to the preceeding small region (1,1) as shown in Table 3.

Then, since a solid column segment is present between the above mentioned region (1,2) and the next small region (1,3), the symbol showing the boundary of the region ("D" in this example) is registered in the small row region registration table 402 as shown in Table 3. Since no solid column segments are present at the positions indicated with circular symbols after the fourth position, the small regions (1,3), (1,4), (1,5) are not registered.

Next, a similar detection process for solid segments is carried out between the second segment CL2 and the third segment CL3 in the row direction shown in FIG. 5. At first, the small region (2,1) to the right of the initially detected solid column segment is registered. Since no solid column segment is detected between this region and the adjacent small region (2,2), the small region (2,2) is registered as it is.

Since a solid column segment is detected between the small regions (2,2) and (2,3), a symbol D indicating the boundary for the regions is registered as shown in Table 1. Since a solid column segment has been detected prior to the next small region (2,3), this small region (2,3) is registered. Since no solid column segment is detected between the small region (2,3) and its adjacent small region (2,4), the small region (2,4) is registered successively being regarded as a continuous region.

Then, since a solid column segment is detected between the small regions (2,4) and (2,5), a region divisional symbol D is registered and, thereafter, the next small region number (2,5) is registered. Then, since a solid column segment is detected after the small region (2,5), the region divisional symbol D is registered as well.

Thereafter, the small row region registration table 402 is prepared in the same manner for each of the small regions as far as the small region (5,5) depending on the presence or absence of the solid column segments between small regions adjacent to each other. Table 3 shows one example for the case of FIG. 5.

The small regions in FIG. 5 are also scanned in the direction of the columns to detect the presence or absence of solid row segments between each of the small regions in the same manner as above and the small column region registration table 403 is prepared in accordance with the detected results.

Table 4 shows the small column region registration table obtained for the example shown in FIG. 5.

TABLE 4

| | | | |
|---|---|---|---|
| (1, 1) | (2, 1) | D | |
| (1, 2) | (2, 2) | D | |
| (3, 2) | D | | |
| (4, 2) | (5, 2) | D | |
| (4, 3) | (5, 3) | D | |
| (2, 5) | (3, 5) | (4, 5) | D |

Since the region divisional symbol D is used in Table 3 and Table 4, the registration may be carried out continuously with no blanks as below, instead of changing rows as in each of the tables.

Table 3→(1,1) (1,2) D (2,1) (2,2) D (2,3) (2,4) . . .
Table 4→(1,1) (2,1) D (1,2) (2,2) D (3,2) D . . .

Next, continuous small regions are collected to extract rectangular regions by way of small region numbers registered in common in the small row region registration table 402 and the small column region registration table 403.

At first, the small region (1,2) is obtained from Table 3 and the small region (2,1) is obtained from the Table 4 as the small regions continuous with the small region (1,1) in the Table 3. Then, the small region continuous with the small region (1,2) is found to be the small region (2,2) from Table 4. Then since other small regions continous with each of these small regions (1,1), (1,2), (2,1) and (2,2) are absent in both of Tables 3 and 4, the above four small regions are collected as constituting one rectangular form and registered in the region registration table 501 as shown in Table 5.

Then, since the second small regions (2,1), (2,2) in Table 3 have already been registered, the operation proceeds further. Since the third small regions (2,3), (2,4) are not registered in Table 4, these small regions are not registered in the region registration table 501, being considered as regions out of the rectangular form.

It can be seen from Table 4 that the fourth small region (2,5) is continuous with the small regions (3,5), (4,5). Accordingly, these small regions (2,5), (3,5), (4,5) are collected together and registered in the region registration table 501 as shown in Table 5.

In the same manner, since the sixth small regions (4,2), (4,3) are continuous with the small regions (5,2), (5,3) in Table 4, they are collected together and registered as shown in Table 5. Since the seventh small region (4,4) in Table 3 is not registered in Table 4, it is judged as being out of the rectangular form. The eighth small region (4,5) and the ninth small regions (5,2), (5,3) have already been registered.

Accordingly, three rectangular regions are extracted in the region registration table 501 and registered as shown in Table 5.

TABLE 5

| Rectangular region No. | small regions contained | | | |
|---|---|---|---|---|
| 1 | (1, 1) | (1, 2) | (2, 1) | (2, 2) |
| 2 | (2, 5) | (3, 5) | (4, 5) | |
| 3 | (4, 2) | (4, 3) | (5, 2) | (5, 3) |

Then, the small region numbers constituting each of the rectangular regions are utilized for determining the position of each of the extracted rectangular regions on the original document.

Since each of the small region numbers is derived from the detection order of the row and column segments as explained above, the relation between each of the extracted rectangular regions and the segments that surround them can be determined by finding the maximum and minimum value for the small region numbers contained in each of the rectangular regions.

For example, in the second region (2,5), (3,5), (4,5) in Table 5, the minimum value for the column segment numbers is the one for the fifth segment. In this case, although the maximum number is also the one for the fifth segment, since each of the small region numbers is described by the segment number present before the small region, the maximum number in this case is the one for the sixth segment.

In the same manner, the minimum and maximum row segment numbers are those for the second segment and the fifth segment, respectively.

Accordingly, it can be seen that the second rectangular region is surrounded with the fifth segment LL5 and the sixth segment LL6 in the direction of the columns and with the second segment CL2 and the fifth segment CL 5 in the direction of rows.

The position for each of the rectangular regions of the original document is determined by the region registration table 501 and the segment position registration table 401 obtained as above, The data are registered in the region position table 502 as shown in Table 6.

TABLE 6

| | |
|---|---|
| First rectangular region | Position for first segment (row) |
| | Position for third segment (row) |
| | Position for first segment (column) |
| | Position for third segment (column) |
| Second rectangular region | Position for second segment (row) |
| | Position for fifth segment (row) |
| | Position for fifth segment (column) |
| | Position for sixth segment (column) |
| Third rectangular region | Position for fourth segment (row) |
| | Position for sixth segment (row) |
| | Position for second segment (column) |
| | Position for fourth segment (column) |

Referring to the numbering of the rectangular forms, if the numbers are to be given in the order represented in the registration region table in Table 5, the position determination and the numbering for each of the regions has been completed.

Figure 6:
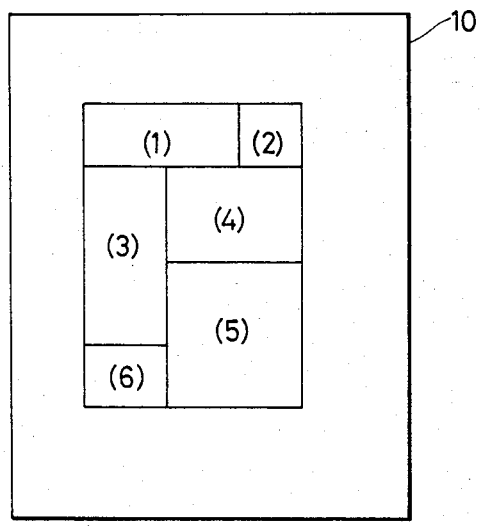
FIG. 6 is a plan view of an original document on which are drawn rectangular patterns having segments in common.

The method of recognizing rectangular patterns as illustrated and explained above can be applied not only to separated rectangular patterns as shown in FIG. 3, but also to the recognition of rectangular patterns having segments in common as shown in FIG. 6.

Figure 7:
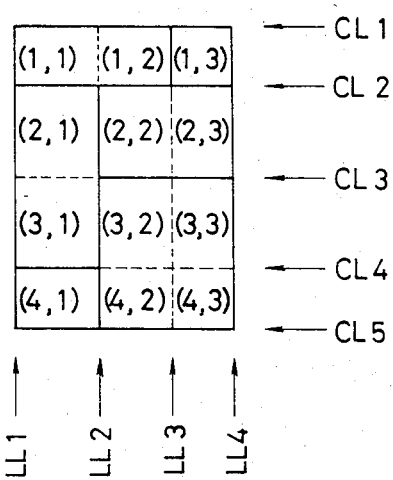
FIG. 7 is a chart showing a group of small rectangular regions generated by the segments detected on the original document shown in FIG. 6.

Specifically, by preparing small regions divided by detected segments (solid and dotted lines) as shown in FIG. 7, rectangular patterns can be extracted depending on the presence or absence for the solid segments between each of the small regions quite in the same manner as above. The order for extracting the rectangular patterns in this case corresponds to the order of the numbers described within the rectangular forms shown in FIG. 6.

It will be apparent that it is, of course, possible to distinguish the rectangular patterns for the case where the rectangular patterns shown in FIGS. 3 and 6 are combined, that is, where separated rectangular patterns and rectangular patterns having segments in common are present together, in the same manner as above.

As is apparent from the foregoing description, according to this embodiment, linear segments constituting the rectangular patterns drawn on an original document can be detected by only one access of the image data in the image memory. As a result, since the rectangular regions can be extracted by merely examining the partial regions between the segments while referring to the data in the segment position registration table, the invention provides a merit of faster pattern recognition as compared with the conventional line tracking method, which requires tracking for all of the four segments constituting a rectangular form.

Since the rectangular pattern recognition apparatus shown in FIG. 2 can recognize the rectangular patterns in a short time as described above, rapid designation, recognition and the like for the portions to be transcribed are enabled upon image processing, whereby processing speed can be improved.

However, since the numbering for the recognized rectangular patterns is carried out, for example, from the upper left to the lower right portions in accordance with the document scanning direction as shown in FIG. 3 in the above embodiment, there is an incovenience in that different or optional numbering of each of the rectangular patterns is impossible.

Figure 8:
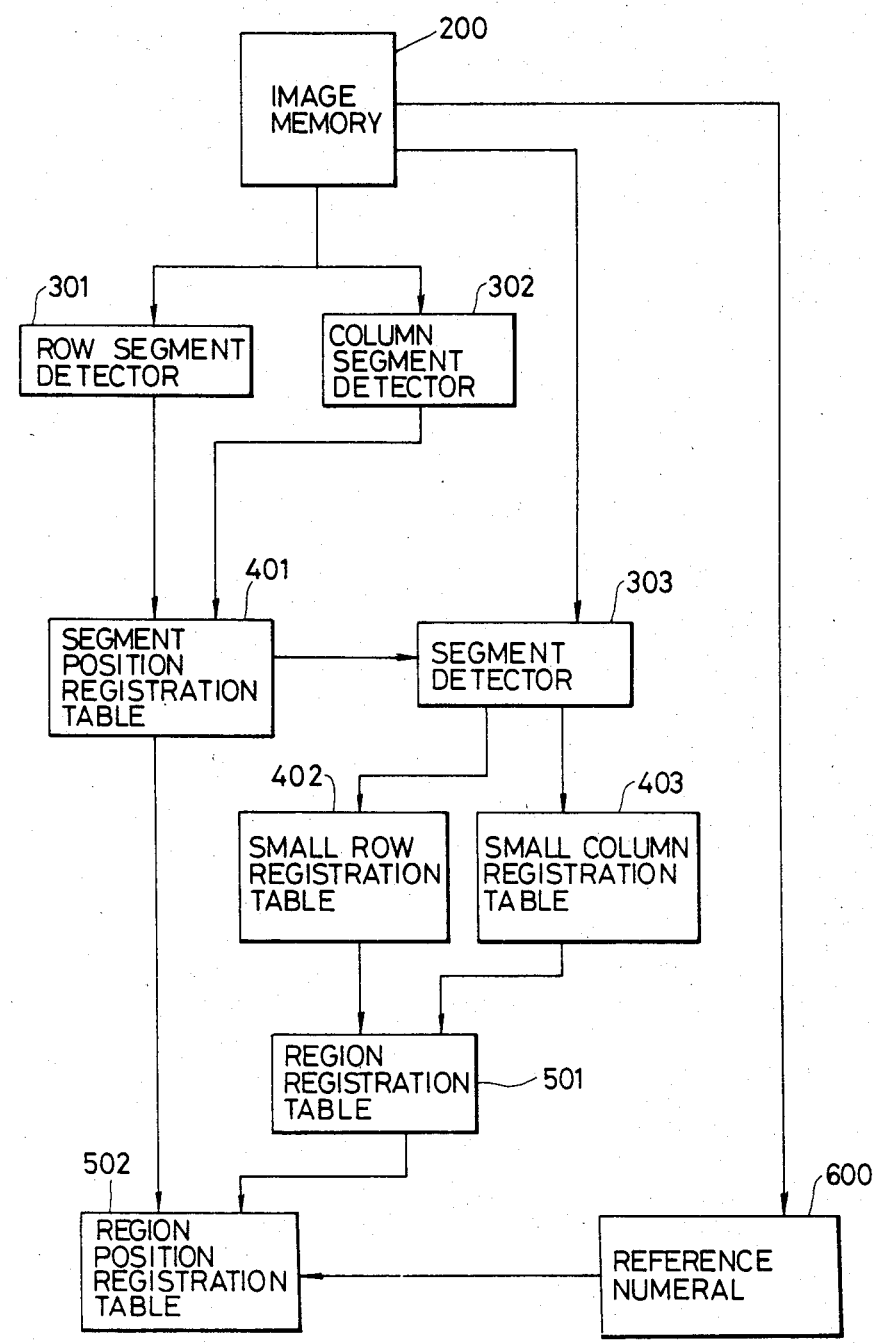
FIG. 8 is a schematic block diagram of another embodiment according to this invention.

FIG. 8 shows a block diagram for the second embodiment of this invention which enables optional numbering. In this figure, the same reference numerals as those in FIG. 2 represent identical or similar portions and reference numeral 600 represents a judging section for distinguishing symbols.

Figures 9, 10A, 10B:
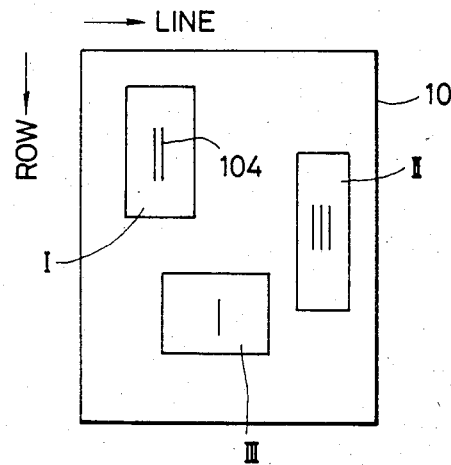
FIG. 9 is a plan view of an original document on which are drawn rectangular patterns having linear distinguishing symbols therein.
FIGS. 10(A) and 10(B) are charts showing one example of the contents of the segment position registration table of the embodiment shown in FIG. 8.

FIG. 9 shows one example of distinguishing symbols suitable for use with the invention. In this example, segments aligned in the direction of the columns are drawn in about the middle in each of the rectangular forms in such a way such that they do not intersect the four sides that constitute the rectangular forms. The number of the segments represents the ordering number for each of the rectangular patterns.

The operation of the second embodiment will now be explained for the case where the pattern shown in FIG. 9 is used as an original document. In the same manner as in the first embodiment, the four sides for each of the rectangular forms are drawn by solid lines and it is again assumed that they are in parallel with the row direction (main scanning direction) or the column direction (sub-scanning direction).

Initially, the patterns on the original document 10 are read by the main and the sub-scanning and stored in the image memory 200. From the image data stored in the image memory 200, the segments drawn in the direction of the rows and columns, respectively, are detected by the row segment detector 301 and the column segment detector 302, and their positions on the original document are registered in the segment position registration table 401 in the same manner as in the first embodiment. One example of the contents of the table 401 is shown in FIG. 10. In FIG. 10, (A) represents the data for the row segments and (B) represents the data for the column segments.

Figure 11:
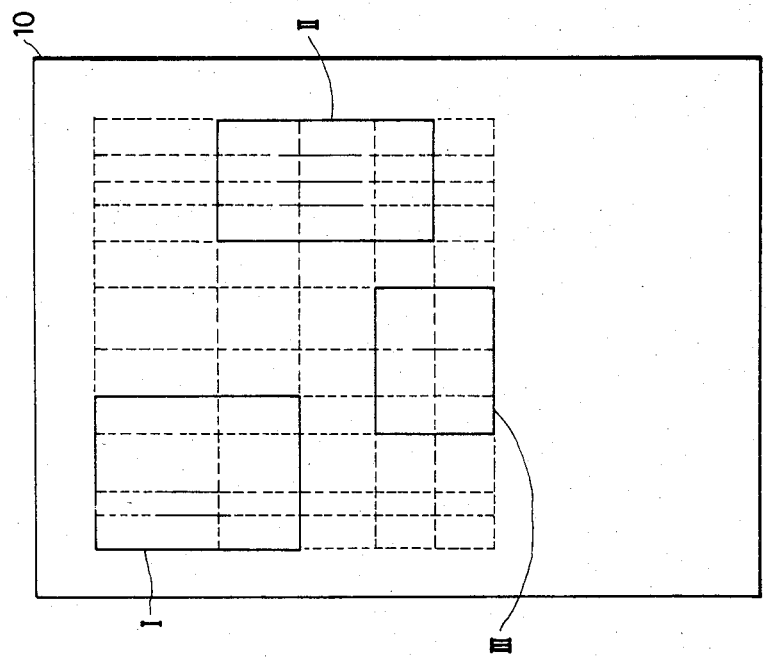
FIG. 11 is a chart showing the group of small rectangular regions generated by the segments detected on the original document shown in FIG. 9.

The segments detected in the case of the original document shown in FIG. 9 are six row segments and 12 column segments, which are represented by solid lines in the row and column directions of FIG. 11, with lattice-like dotted lines formed respectively by extending each of the solid lines. It is to be noted here that continuous black picture elements of more than a predetermined number are necessary for detection as a segment, so that neither noise nor short segments can be detected as described above.

Figure 12:
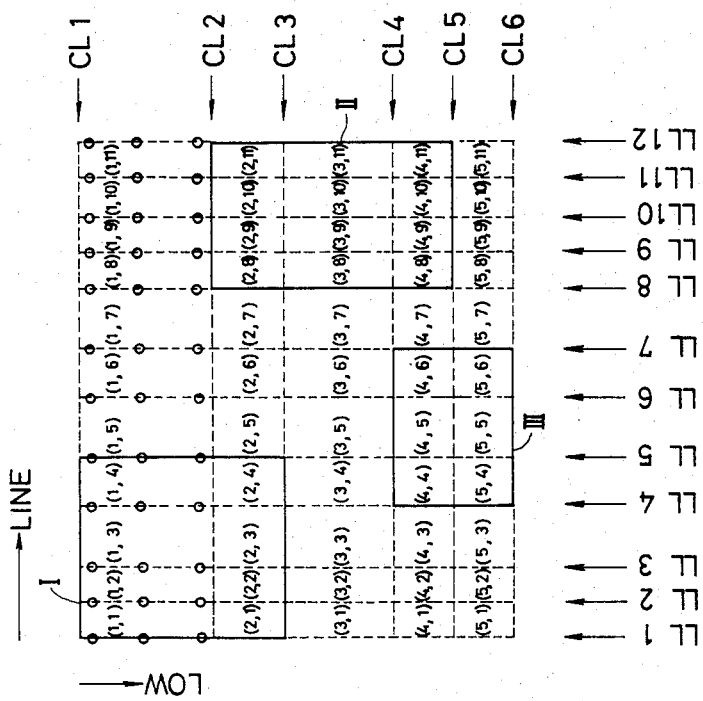
FIG. 12 is a chart showing numbering applied to the small rectangular regions, as well as to the row and column segments shown in FIG. 11.

FIG. 12 shows the detected segment portions of FIG. 11. Each of the segments is numbered on every row and column in the same manner as in the first embodiment. Further, a region number based on the above segment number is given each of the small regions divided by the solid and dotted lines.

As is apparent from FIG. 12, the three rectangular patterns I–III in FIGS. 9 and 11 respectively comprise the following assemblies of small rectangular regions.

Rectangle I ... {(1,1), (1,2), (1,3), (1,4), (2,1), (2,2), (2,3), (2,4)},

Rectangle II ... {(2,8), (2,9), (2,10), (2,11), (3,8), (3,9), (3,10), (3,11), (4,8), (4,9), (4,10), (4,11)}, Rectangle III ... {(4,4), (4,5), (4,6), (5,4), (5,5), (5,6)}

Accordingly, for recognizing rectangular patterns, each of the rectangular patterns I–III are at first recognized as the assembly of each of the foregoing small regions, and each of the small regions are collected in the same manner as in the first embodiment, to thereby determine the position of each of the rectangular patterns on the original document.

In view of the above, the presence or absence of solid segments is examined by the segment detector 303, with respect to the three positions on the column segments indicated with circular symbols between the first segment CL1 and the second segment CL 2 in the column direction shown in FIG. 12, that is, the positions just below the first segment CL1, between the first and second segments CL1 and CL2 and just above the second segment CL2.

If solid segments are present in all of the above three positions, the segment is judged as a segment for forming a rectangular pattern. On the other hand, if a solid segment is absent even at only one of the above three positions, the portion is judged as being an extension from the segment of another rectangular form, or as a part of the distinguishing symbol described within the rectangular form.

For the positions designated with the circular symbols in FIG. 12, since solid segments are present in all of the three positions on the first column segment LL1, the small region number (1,1) at the right of this segment is registered in the small row region registration table 402 as shown in Table 7.

Then, at the boundary between the small region (1,1) and the adjacent small region (1,2), since the solid segment is present just above the second row segment CL2 but no solid segments are present just below the first segment CL1 and intermediate the first and the second segments CL1 and CL2, the small region (1,2) is registered directly after the small region (1,1)

TABLE 7

| (1, 1) | (1, 2) | (1, 3) | (1, 4) | D |
|--------|--------|--------|--------|---|
| (2, 1) | (2, 2) | (2, 3) | (2, 4) | D |
| (2, 5) | (2, 6) | (2, 7) | D      |   |
| (2, 8) | (2, 9) | (2, 10)| (2, 11)| D |
| (3, 8) | (3, 9) | (3, 10)| (3, 11)| D |
| (4, 4) | (4, 5) | (4, 6) | D      |   |
| (4, 7) | D      |        |        |   |
| (4, 8) | (4, 9) | (4, 10)| (4, 11)| D |
| (5, 4) | (5, 5) | (5, 6) | D      |   |

In the same manner, since the small regions (1,3), (1,4) are also continuous regions, they are registered as shown in Table 7 as they are. However, since a solid segment is present between the small regions (1,4) and (1,5), a region divisional symbol (represented as D herein) is registered. Since no solid segments are detected in the small regions from (1,5) to (1,11), they are not registered.

Referring to the continuity of the first several small regions between the second segment CL2 and the third segment CL3 in the row direction, these regions will be judged the same way as above, since the regions from the small region (2,1) to the small region (2,4) are continuous, and they will be successively registered as shown in Table 4 with the region divisional symbol D registered thereafter. Further, since the regions from the small region (2,5) to the small region (2,7) are also continuous, they are registered successively.

Thereafter, registration is carried out in the same manner, depending upon the presence or absence of solid segments between each of the small regions, and the small row region registration table as in Table 7 is prepared. Quite in the same manner, the results of checking each of the small regions in the column direction are registered in the small column region registration table 403 as shown in Table 8.

Then, in the same manner as in the first embodiment, each of the small regions are combined to extract a large rectangular region by way of the small regions in common to the above registration tables 402 and 403.

That is, the small regions continuous with the small region (1,1) are the regions (1,2), (1,3), (1,4) in Table 7 and the region (2,1) in Table 8. Then, the small regions continuous to the small region (2,1) are the regions (2,2), (2,3) and (2,4) in Table 7.

Since it has now been found that the small regions (1,1), (1,2), (1,3), (1,4), (2,1), (2,2), (2,3) and (2,4) constitute one rectangular region, by the above procedures, they are registered in the region registration table 501 as shown in Table 9.

TABLE 8

| (1, 1) | (2, 1) | D | |
| (1, 2) | (2, 2) | D | |
| (1, 3) | (2, 3) | D | |
| (1, 4) | (2, 4) | D | |
| (3, 4) | D | | |
| (4, 4) | (5, 4) | D | |
| (4, 5) | (5, 5) | D | |
| (4, 6) | (5, 6) | D | |
| (2, 8) | (3, 8) | (4, 8) | D |
| (2, 9) | (3, 9) | (4, 9) | D |
| (2, 10) | (3, 10) | (4, 10) | D |
| (2, 11) | (3, 11) | (4, 11) | D |

Next, in Table 7, the second small regions have already been registered, and since no regions continuous to the third small regions (2,5), (2,6) and (2,7) are present, the third small regions are considered as being out of the rectangular form.

Thereafter, a total of three regions are extracted as continuous regions, that is, the rectangular regions as shown in Table 9, in the same manner.

TABLE 9

| Rectangular region | Small region numbers contained | | | | | | | | | | | | |
|---|---|---|---|---|---|---|---|---|---|---|---|---|---|
| First region | (1, 1) | (1, 2) | (1, 3) | (1, 4) | (2, 1) | (2, 2) | (2, 3) | (2, 4) | | | | | |
| Second region | (2, 8) | (2, 9) | (2, 10) | (2, 11) | (3, 8) | (4, 8) | (3, 9) | (4, 9) | (3, 10) | (4, 10) | (3, 11) | (4, 11) | |
| Third region | (4, 4) | (4, 5) | (4, 6) | (5, 4) | (5, 5) | (5, 6) | | | | | | | |

TABLE 10

| | | Row segment | | Column segment | |
|---|---|---|---|---|---|
| | Region number | beginning line | end line | beginning line | end line |
| First region | 2 | CL 1 | CL 3 | LL 1 | LL 5 |
| Second region | 3 | CL 2 | CL 5 | LL 8 | LL 12 |

TABLE 10-continued

| | | Row segment | | Column segment | |
|---|---|---|---|---|---|
| | Region number | beginning line | end line | beginning line | end line |
| Third region | 1 | CL 4 | CL 6 | LL 4 | LL 7 |

Next, the region position registration table 501 as shown in Table 10 is obtained by defining the four sides of each of the rectangular regions with row and column segments, quite in the same manner as in the first embodiment. However, the region numbers (numbering of the rectangular forms) has not yet been obtained at this stage in Table 10.

Thus, the image data inside each of the rectangular forms, that is, the number of solid segments in the rectangular form is detected by a judging section 600 for identifying the symbols, using the position registration data for each of the rectangular regions obtained in Table 10. As stated above, solid segments are drawn in the column direction inside each of the rectangular regions about at the middle of the column direction thereof so they they do not intersect the upper and lower sides, and the number of solid segments constitutes the distinguishing symbol for the rectangular form.

The solid column segments can be detected by scanning each of the rectangular regions in the column direction at about the middle portion between the upper and the lower sides, in dependence upon the presence or absence of more than a predetermined number of continuous black bits arranged in the column direction.

In the case of the original document shown in FIGS. 9 and 11, since two solid segments are drawn in the first rectangular regions I and one and three solid segments are drawn in the first and third rectangular regions III and II, respectively, the numbering for the respective rectangular regions is made in the order No. 2, No. 3 and No. 1. Accordingly, this data is added to the region position registration table 502, whereby the number and the position on the original document of each of the rectangular regions is defined as shown in Table 10.

According to this aspect of the invention, the same effects as in the first embodiment can be attained and, in addition, a further advantage is obtained in that an optional numbering of the rectangular patterns drawn on the original document can be easily obtained.

In this embodiment, the distinguishing symbol used for numbering is not limited to the illustrated column segment, but may also be either row segments or symbols such as dots circles, etc.

Further, it will be apparent that the above numbering method can also be applied in the case where rectangular patterns have segments in common as shown in FIG. 6, or where separated rectangular patterns and rectangular patterns having segments in common are present together.

What is claimed is:

1. A rectangular pattern recognition apparatus, comprising:

an image memory for storing picture element information obtained by scanning an original document on which is drawn at least one solid line rectangular pattern composed of two sets of parallel solid segments aligned in row and column directions, respectively, means for detecting line segments aligned in said row and column directions, means for the registration of segment positions in said row and column directions, small row region registration means for defining small regions divided by the registered row and column segments and for registering continuous small regions divided by solid lines in regions divided by adjacent row segments, small column registration means for registering continuous small regions divided by solid lines in regions divided by adjacent column segments, and region registration means for registering continuous small regions registered in common in said small row and column region registration means as being contained in a common rectangular form.

2. A rectangular pattern recognition apparatus, comprising:

an image memory for storing picture element information obtained by scanning an original document on which are drawn a plurality of solid line rectangular patterns each composed of two sets of parallel segments aligned in row and column directions, respectively, and each having in the inside thereof distinguishing symbols, means for detecting line segments arranged in row and column directions, means for the registration of segment positions in said row and column directions, small row region registration means for defining small regions divided by the registered row and segments and for registering continuous small regions divided by solid lines in continuous regions divided by adjacent row segments, small column region registration means for registering continuous small regions divided by solid lines in regions divided by adjacent column segments, region registration means for registering continuous small regions registered in common in said small row and column region registration means as being contained in a common rectangular form, region position registration means for registering the position of boundary lines of each rectangular form, and a judging section for identifying said distinguishing symbols.

3. A rectangular pattern recognition apparatus as claimed in claim 1, wherein said original document contains a plurality of said solid line rectangular patterns.

4. A rectangular pattern recognition apparatus as claimed in claims 1 or 2, wherein said solid line rectangular patterns are at least partially contiguous.

5. A rectangular pattern recognition apparatus as claimed in claim 1, further comprising means for identifying symbols located within said rectangular patterns, and means for discriminating said symbols from said parallel solid segments constituting sides of said rectangular patterns.

6. A rectangular pattern recognition apparatus as claimed in claim 5, said symbols comprising information for sequencing or numbering said rectangular patterns.

7. A rectangular pattern recognition apparatus as claimed in claim 5, said region registration means including information regarding all of said small regions contained within a rectangular pattern, as well as information regarding the numbering of said rectangular pattern.

8. A rectangular pattern recognition apparatus as claimed in claim 2, said judging section determining the number of said symbols, said symbols being numbering symbols for said rectangular forms wherein the number of said symbols within a rectangular form is indicative of the numbering of said rectangular form.

9. A rectangular pattern recognition apparatus as claimed in claim 8, said judging section determining the numbering of said rectangular forms and registering said numbering in said region position registration means as the region number for each of said rectangular forms.

* * * * *